(12) United States Patent
Kumaki et al.

(10) Patent No.: US 8,337,639 B2
(45) Date of Patent: Dec. 25, 2012

(54) DIE REINFORCING METHOD AND DIE REPAIRING METHOD

(75) Inventors: Toshimasa Kumaki, Mooka (JP);
Mitsuo Kuwabara, Tsurugashima (JP);
Kazuo Matsushita, Shimotsuke (JP)

(73) Assignee: Honda Motor Co., Ltd., Tokyo (JP)

( * ) Notice: Subject to any disclaimer, the term of this patent is extended or adjusted under 35 U.S.C. 154(b) by 1040 days.

(21) Appl. No.: 11/921,317

(22) PCT Filed: Oct. 26, 2006

(86) PCT No.: PCT/JP2006/310678
§ 371 (c)(1),
(2), (4) Date: Nov. 30, 2007

(87) PCT Pub. No.: WO2006/129608
PCT Pub. Date: Dec. 7, 2006

(65) Prior Publication Data
US 2009/0205752 A1    Aug. 20, 2009

(30) Foreign Application Priority Data

| Jun. 1, 2005 | (JP) | ................................. 2005-161481 |
| Jun. 1, 2005 | (JP) | ................................. 2005-161545 |
| May 22, 2006 | (JP) | ................................. 2006-141290 |
| May 22, 2006 | (JP) | ................................. 2006-141294 |

(51) Int. Cl.
*C23C 8/00* (2006.01)
*C23C 22/00* (2006.01)

(52) U.S. Cl. .......................... 148/210; 148/207; 148/225
(58) Field of Classification Search .................. 148/210, 148/207, 225
See application file for complete search history.

(56) References Cited

U.S. PATENT DOCUMENTS

| 4,788,842 A | * | 12/1988 | Kopp et al. ........................ 72/45 |
| 2006/0134453 A1 | | 6/2006 | Kuwabara et al. |

FOREIGN PATENT DOCUMENTS

| JP | 62-009744 | | 1/1987 |
| JP | 01-210133 | | 8/1989 |
| JP | 03-287702 | | 12/1991 |
| JP | 06-007877 | | 1/1994 |
| JP | 09168856 A | * | 6/1997 |
| JP | 10-219474 | | 8/1998 |
| JP | 2004-68047 | | 4/2004 |
| JP | 2005-097743 | | 4/2005 |

* cited by examiner

*Primary Examiner* — Stanley Silverman
*Assistant Examiner* — Alexander Polyansky
(74) *Attorney, Agent, or Firm* — Squire Sanders (US) LLP

(57) ABSTRACT

A mixed powder layer is applied by coating to a cavity of a forging die made of an Fe-base alloy, at least to the region of the cavity to be reinforced or repaired, the mixed powder layer comprising the first element powder capable of being converted into a carbide to enhance the hardness of the forging die and the second element powder having a melting point lower than that of the first element powder. Die reinforcing is carried out by forging a work by using a forging die covered with the mixed powder layer and heat-treating the die by utilizing the working heat generated in the forging to thereby make the layer reflow and diffuse the carbide in the die.

10 Claims, 4 Drawing Sheets

DIE REINFORCING METHOD AND DIE REPAIRING METHOD

TECHNICAL FIELD

The present invention relates to a method for reinforcing a die and a method for repairing a die to reinforce and repair various types of dies such as forging dies.

BACKGROUND ART

In general, in the case of dies including, for example, forging dies, press working dies, and casting dies, stress acts on a portion where the die members make mutual abutment, and on portions thereof where molten metal tends to collide at high speed. As a result, cracks and/or abrasions may occur.

The damaged portion, which appears as a crack or an abrasion on the die, brings about factors causing burrs and/or strain. Burr-removal and shaping operations, which are performed on the product during downstream steps, are consequently increased. In view of the above, in order to avoid the occurrence of defects in the product, as described above, the die is reinforced beforehand in some cases, or the damaged die may be repaired in other cases.

A conventional method is known for reinforcing a die, in which padding is performed utilizing an electric discharge coating, for portions of the die which tend to suffer from damage. In the case of such a padding method, the electric discharge coating treatment is produced as follows. That is, a high temperature caused by spark discharge is utilized so that an electrode material, which includes, for example, metal, ceramic carbide, and cermet, is vapor-deposited onto the surface of portions of the die suffering from damage, to perform surface treatment for improving, for example, hardness, corrosion resistance, and durability (see, for example, Japanese Laid-Open Patent Publication No. 01-210133).

The reinforcing method described above may also be applied in relation to repairs performed when damaged portions appear on the die as well.

However, in the reinforcing and repair methods described above, the joining strength is weak and brittle at the joined area between the padding portion and the die, and therefore durability thereof is limited. Thus, there is a drawback in that the reinforcement or repair must be performed frequently, resulting in a consequent lowering of productivity.

In particular, in the case of a forging die, the padding portion tends to become exfoliated due to high stress exerted during use, in addition to thermal fatigue. In this case, it is difficult to perform reinforcement and repair by means of such padding. Therefore, when the forging die becomes damaged, the forging die must be scrapped, resulting in economic loss.

DISCLOSURE OF THE INVENTION

A general object of the present invention is to provide a method for reinforcing a die, which makes it possible to effect strong and reliable reinforcement.

A principal object of the present invention is to provide a method for reinforcing a die, which enhances the durability of the die.

Another object of the present invention is to provide a method for reinforcing a die, which improves productivity and economic performance.

Still another object of the present invention is to provide a method for repairing a die to restore the durability of the die.

Still another object of the present invention is to provide a method for repairing a die, which makes it possible to improve productivity when manufacturing products.

According to one aspect of the present invention, there is provided a method for reinforcing a die composed of an Fe-based alloy, comprising the steps of:

coating at least a planned reinforcement region of the die with a mixed powder including a first element powder, which has a property to increase hardness of the die by forming a carbide, and a second element powder having a melting point lower than that of the first element powder; and carbonizing the first element powder included in the mixed powder to effect diffusion in the die by heat-treating at least the planned reinforcement region of the die coated with the mixed powder utilizing processing heat generated when a workpiece is processed with the die. That is, the reinforcing method is carried out before any damaged portion appears in the die.

According to the present invention, it is possible to reliably improve the strength and hardness of the die. Therefore, for example, it is possible to obtain a forging die having high durability, in which breakage is rarely caused and abrasion hardly occurs even when the forging process is repeatedly performed. It is possible to contribute to improvements in economic performance and productivity in manufacturing products. It is a matter of course that the same or equivalent effect may also be obtained for other types of dies, including press working dies and casting dies.

Heat treatment is performed on the die by utilizing the processing heat of the workpiece. Therefore, it is possible to reduce labor and the number of process steps, and it is possible to reduce production costs.

When a workpiece is processed by the die, it is preferable that the mixed powder and the workpiece are prevented from making contact with each other by means of a parting agent, which is applied to an inner surface of the die. Accordingly, actions may be avoided, which would otherwise be exerted on the workpiece by the mixed powder.

According to another aspect of the present invention, there is provided a method for repairing a die composed of an Fe-based alloy, comprising the steps of:

coating at least a planned repair region of the die with a mixed powder including a first element powder, which has a property to increase hardness of the die by forming a carbide, and a second element powder having a melting point lower than that of the first element powder; and carbonizing the first element powder included in the mixed powder to effect diffusion in the die by heating at least the planned repair region of the die coated with the mixed powder.

That is, the repair method is carried out in order to restore damaged portions after they have appeared on the die. According to the repair method, it is possible to restore the strength and hardness of the die. Therefore, a die having high durability can be obtained, in which breakage is rarely caused and abrasion hardly occurs, even when the forging process is repeatedly performed. Consequently, productivity in manufacturing products can be improved.

In any case, preferred examples of the Fe-based alloy may include alloy steel such as tool steel, high speed tool steel, die steel, and powder high speed steel, structural alloy steel such as SCM, SNC, SNCM, and SCr, and structural steel such as carbon steel and low carbon steel.

It is preferable for the first element powder to be one selected from the group consisting of Fe, Ni, and Co, wherein the Fe-based alloy is satisfactorily formed into carbide.

It is preferable for the second element powder to be Al or Al—Mn eutectic alloy. The melting point of Al is lower than that of the first element powder. Further, the eutectic point of the Al—Mn eutectic alloy is lower than the melting point of Al. Al and Al—Mn eutectic alloy, as described above, act as an attracting or inducing agent for the first element powder.

It is preferable for a reducing agent to be blended with the mixed powder in order to reduce the occurrence of oxide film existing on a surface of the Fe-based alloy. In this case, the oxide film is removed when atoms of the first element powder are diffused. Therefore, atomic diffusion is caused with low energy.

Further, when Al is used as the second element powder, oxidation of Al is avoided by capturing oxygen via the reducing agent. Therefore, deterioration in the characteristics of Al is avoided, and the first element powder exhibits satisfactory tight contact performance with respect to the Fe-based alloy.

Preferred examples of the reducing agent may include carbon powder and resin.

It is more preferable for W, Ti, V, Mo, or Nb to be added to the mixed powder for the following reason. That is, in this case, the strength of the die is further improved.

BEST MODE FOR CARRYING OUT THE INVENTION

The die-reinforcing method and the die-repairing method according to the present invention shall be explained in detail below with reference to the accompanying drawings, which show preferred embodiments of the invention.

Figure 1:
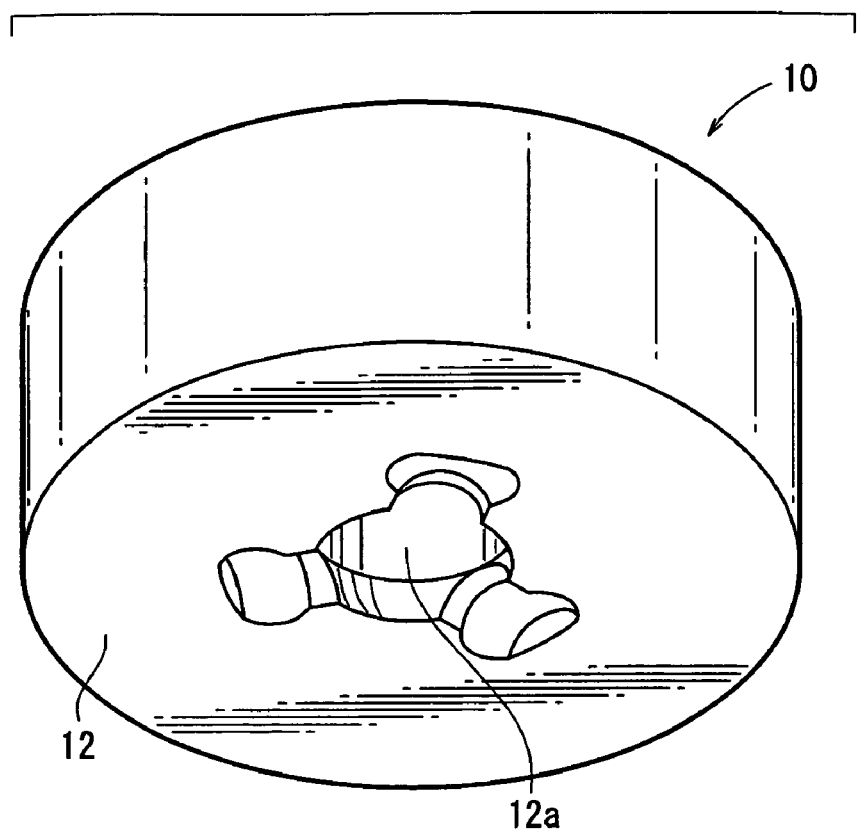
FIG. 1 is a schematic perspective view illustrating a forging die on which the method for reinforcing the die, or the method for repairing the die, according to embodiments of the present invention are carried out.
Figure 1:
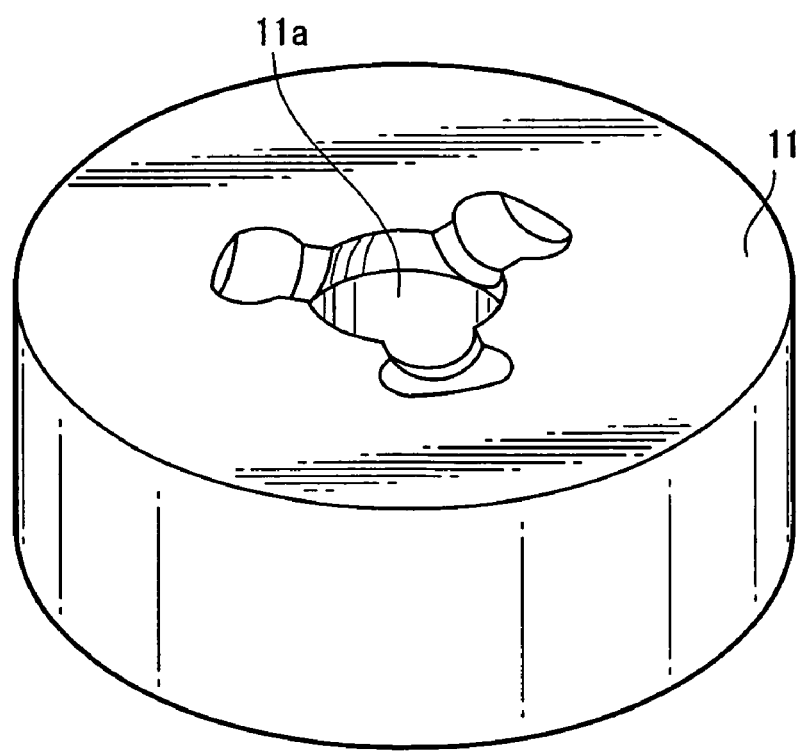

At first, an explanation shall be made concerning a method for reinforcing a forging die 10 shown in FIG. 1.

The forging die 10, which is composed of an Fe-based alloy including, for example, alloy steel such as tool steel, high speed tool steel, die steel, and powder high speed steel, is usable to form and forge a spider that forms part of a constant velocity universal joint in order to smoothly transmit engine power to the wheels of an automobile at a constant velocity. The forging die 10 is composed of the Fe-based alloy including, for example, alloy steel such as tool steel, high speed tool steel, die steel, and powder high speed steel.

The forging die 10 is provided with a lower die 11 and an upper die 12, wherein the upper die 12 is displaceable relatively with respect to the lower die 11. The lower die 11 and the upper die 12 are formed with cavities 11a, 12a therein, which are consistent with the shape of the spider, and into which a heated and softened material (workpiece) such as steel is forcibly introduced respectively.

Figure 2A:
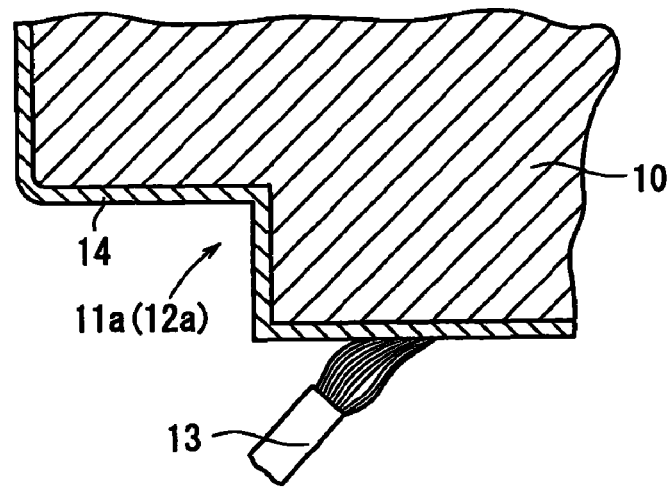
FIGS. 2A to 2C are views of steps of the process for reinforcing the forging die shown in FIG. 1.
Figure 2B:
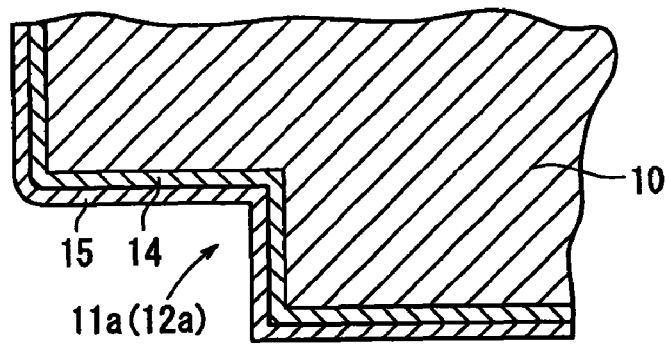
Figure 2C:
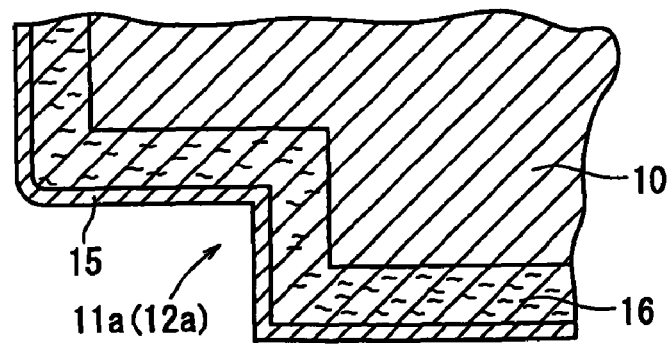

An explanation shall be made with reference to FIGS. 2A to 2C concerning the method for reinforcing the forging die 10. At first, a mixed powder is prepared. The mixed powder is composed of a first element powder, which has a property that acts to increase hardness of the forging die 10 composed of alloy steel as the Fe-based alloy by forming a carbide, and a second element powder having a melting point lower than that of the first element powder, for example, a melting point of 600° C. to 750° C.

Preferred examples of the first element powder include at least one selected from the group consisting of Fe, Ni, and Co. When the metal species of the carbide intended to be diffused in the downstream step is Fe, it is appropriate to prepare a mixed powder blended with Fe powder. When the metal species intended to be diffused is Ni, it is appropriate to prepare a mixed powder blended with Ni powder. When the metal species intended to be diffused is Co, it is appropriate to prepare a mixed powder blended with Co powder. Of course, when both of Fe and Co are diffused, it is appropriate to prepare a mixed powder blended with both Fe and Co powders.

On the other hand, preferred examples of the second element powder include Al or Al—Mn eutectic alloy.

Usually, a spontaneously formed oxide film will be present on the surface of the forging die 10 (alloy steel) as the reinforcement objective. If metal atoms contained in the first element powder are diffused in this state, it is necessary to supply an extremely large amount of thermal energy, so that the metal atoms successfully pass through the oxide film. In order to avoid such an inconvenience, it is preferable that the mixed powder is mixed with a reducing agent, for example, carbon, which is capable of reducing the oxide film.

Alternatively, the mixed powder, made up of the first and second element powders, may be added to a solvent. A substance, which acts as a reducing agent on the oxide film and which does not react with alloy steel, may be dispersed or dissolved in the solvent in order to prepare a coating agent. Preferred examples of the aforementioned reducing agent may include, without limitation, respective resins of nitrocellulose, polyvinyl, acrylic, melamine, styrene, and epoxy. It is appropriate if the concentration of the reducing agent is about 5%.

A substance, which has a property to increase the reinforcement strength of the forging die 10, may be added to the mixed powder. Preferred examples of this substance may include at least one selected from the group consisting of W, Ti, V, Mo, and Nb.

As shown in FIG. 2A, the mixed powder is applied to the surface of the cavity 11a (12a) that forms the planned reinforcement region of the forging die 10, thereby to form a mixed powder layer 14 thereon.

Application of the mixed powder may be performed by applying a coating agent, which is prepared by dispersing the mixed powder in a solvent as described above. As for the solvent, it is preferable to select an organic solvent, such as acetone or alcohol, which is easily evaporated. When the coating agent is prepared, it is appropriate to disperse a powder of, for example, Ni or Co in the solvent. A powder of, for example, C or Si, as the reducing agent, may be dispersed in the solvent as well.

As for the application method, a brush coating method, based on use of a brush 13, may be adopted. Of course, it is also appropriate to adopt other known application techniques, such as a spray application, rather than a brush coating method.

Subsequently, as shown in FIG. 2B, a parting agent 15 is applied on the mixed powder layer 14 in the cavity 11a (12a).

Then, a heated material (not shown) is forcibly introduced into the cavity 11a (12a). During this procedure, the mixed powder layer 14 does not make contact with the material owing to the presence of the parting agent 15.

Subsequently, so-called die closing is performed. Accordingly, a forging process is started on the material, and a constant velocity universal joint having a predetermined shape is finally formed.

During this process, heat treatment is advanced in the cavity 11a (12a) of the forging die 10 due to the following reasons. That is, heat is transmitted from the material to both the lower die 11 and the upper die 12 as die closing is performed.

As described above, in the embodiment of the present invention, processing heat of the material is utilized to perform a heat treatment on the forging die 10. Therefore, it is possible to reduce the number of steps and labor, and it is also possible to reduce costs required for performing reinforcement on the forging die.

Reflow of the mixed powder layer 14 is caused during heat treatment. The inner surface of the cavity 11a (12a) of the forging die 10 is uniformly coated with the mixed powder. During this process, the second element powder, which has a melting point lower than that of the first element powder, is melted earlier. Accordingly, the first element powder and at least one selected from the group consisting of W, Ti, V, Mo, and Nb are equivalently subjected to coating as if being induced by the second element powder.

This phenomenon occurs more promptly when the second element powder has a lower melting point. Therefore, as described above, it is preferable to use Al, which has a relatively low melting point among metals, or an Al—Mn eutectic alloy, which has a eutectic point lower than the melting point of Al. $A^1$ is moved to the surface layer while being replaced by the first element powder. Al finally becomes bonded to oxygen in the solvent or the like, and is converted into a sludge at the surface layer. Therefore, the occurrence of brittleness and breakage of the forging die 10, which would be otherwise caused by the presence of Al at the inside, can be avoided.

When a reducing agent such as carbon powder or resin is present in the mixed powder, the reducing agent captures oxygen. For example, the carbon power or resin is decomposed to generate C, which reacts with oxygen to produce CO and $CO_2$. Therefore, it is possible to avoid oxidation of various metals, of which Al is representative.

Further, the first element powder reacts with C as a constitutive element of the alloy steel, and/or C generated by decomposition of the reducing agent in the cavity 11a (12a) of the forging die 10, in order to produce carbide. When at least one of the elements selected from the group consisting of W, Ti, V, Mo, and Nb is added, the element forms carbide as well.

The produced carbide is diffused into the inner deep portion of the cavity 11a (12a) of the forging die 10, while repeating decomposition and formation. That is, the produced carbide is immediately decomposed and returned to the first element powder, whereupon the substance is relatively diffused and moved toward the surface layer in this state.

In this way, carbide becomes diffused into the cavity 11a (12a) of the forging die 10. As a result, a diffusion layer 16 is formed as shown in FIG. 2C. The thickness of the diffusion layer, i.e., the distance at which the carbide is diffused, maximally ranges to a depth of about 15 mm from the surface.

The concentration of carbide gradually decreases, and no distinct interface appears between the forging die 10 and the terminal end of arrival of the diffused carbide.

Therefore, the occurrence of brittle fractures, which would be otherwise caused by the occurrence of stress concentration on such portions, can be avoided. Therefore, toughness is secured for the cavity 11a (12a) of the forging die 10 in which the diffusion layer 16 has been formed.

In other words, during this procedure, it is possible to avoid increasing brittleness, which would be otherwise caused by diffusion of the metal element. Therefore, even when the forging process is repeatedly performed, damage such as breakage of the forging die 10 is rarely caused. That is, a long service life for the forging die 10 can be obtained.

Further, hardness of the forging die 10 is improved in the carbide-containing regions thereof. As described above, in the method for reinforcing the die according to the embodiment of the present invention, carbide exists even at deep inner portions of the forging die 10. Therefore, hardness and strength of the forging die 10 are increased over a range until arrival at the inner portion. As a result, abrasion resistance is improved at the inner portion, and deformation of the forging die 10 rarely occurs.

Further, as a result of the production of, for example, TiC and TiN, heat resistance of the metal is improved owing to a so-called carbide effect, and strength of the metal is improved owing to a so-called carbide diffusion effect.

Spiders are continuously produced using the forging die 10, which has been reinforced during the previous forging process. That is, a warm forging process or a hot forging process may be repeatedly carried out. However, as described above, since reinforcement is applied to the forging die 10, the occurrence of cracks or abrasions in the forging die 10 are suppressed. Consequently, it is possible to continuously manufacture spiders, which are excellent in dimensional accuracy, over a long period of time.

Next, an explanation shall be given concerning a method for repairing the forging die 10.

Figure 3:
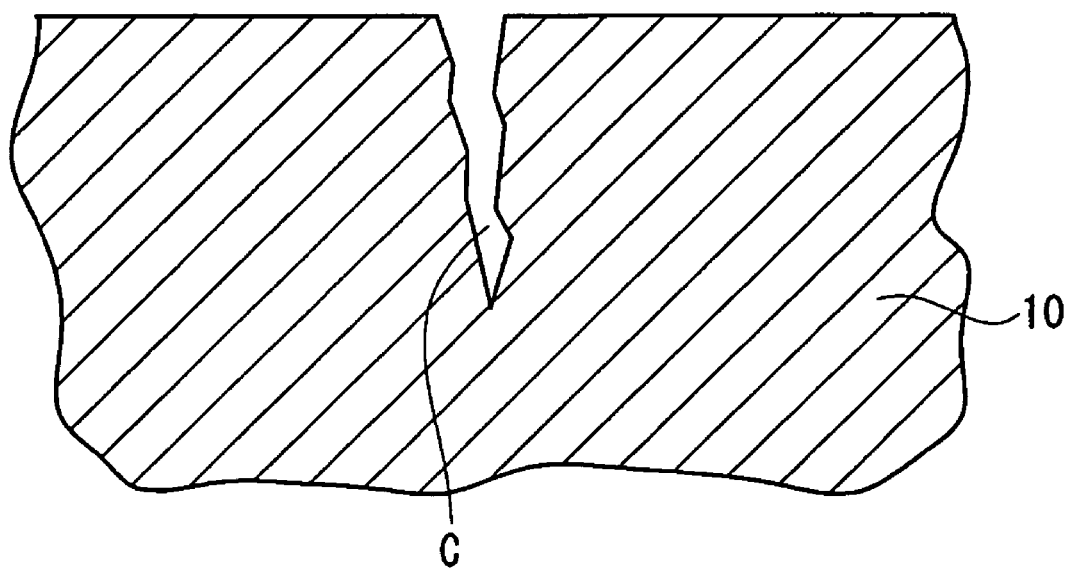
FIG. 3 is a schematic vertical sectional view illustrating a main part and depicting a state in which a crack (damaged portion) of the forging die shown in FIG. 1 is filled with a coating agent.

Repair of the forging die 10 may be carried out when forging is repeatedly conducted and damaged portions, such as a crack C, is formed as shown in FIG. 3. The repair method generally corresponds to the reinforcement method described above.

Figure 4A:
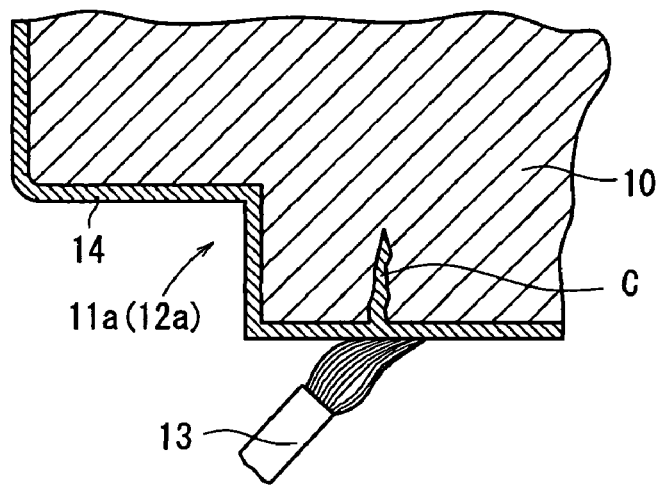
FIGS. 4A to 4C are views of steps of the process for repairing the forging die shown in FIG. 1.

That is, as shown in FIG. 4A, the mixed powder is applied to the region in which the crack C appears on the surface of the cavity 11a (12a) of the forging die 10, i.e., the planned repair region, in order to fill the crack C therewith. Accordingly, the mixed powder layer 14 is formed on the crack C.

Also in this case, it is possible to employ a brush coating method, based on use of the brush 13. Of course, other known application techniques, such as spray application, may also be adopted rather than the brush coating method.

Figure 4B:
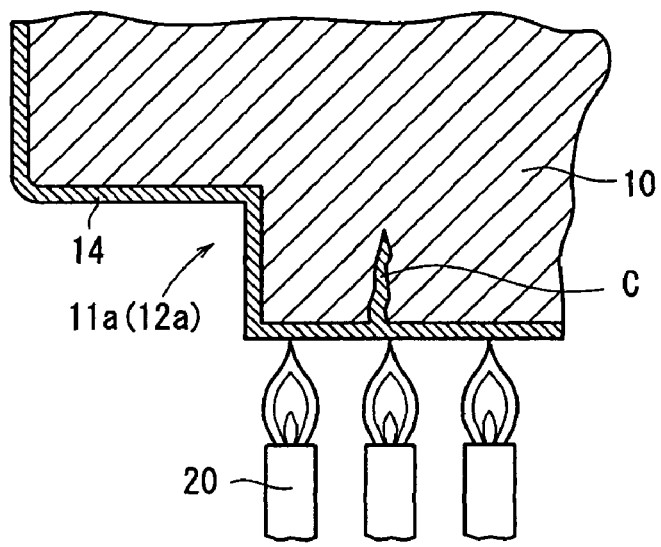

Subsequently, as shown in FIG. 4B, heat treatment is applied to the cavity 11a (12a) of the forging die 10. During this procedure, heat treatment is performed with burner flames 20.

Reflow of the mixed powder layer 14 is caused during heat treatment, in the same manner as in the above reinforcement treatment. The inner surface of the cavity 11a (12a) of the forging die 10 is uniformly coated with the mixed powder. During this process, the second element powder, which has a melting point lower than that of the first element powder, is melted earlier. Accordingly, the first element powder and at least one selected from the group consisting of W, Ti, V, Mo, and Nb are equivalently advanced into the forging die 10 from the interior of the crack C, as if being induced by the second element powder.

On the other hand, the first element powder reacts with C as a constitutive element of the alloy steel, and/or with C generated by decomposition of the reducing agent in the cavity 11a (12a) of the forging die 10, to produce carbide. Also in this case, carbide is diffused into deep inner portions of the cavity 11a (12a) of the forging die 10, while decomposition and formation thereof is repeated.

Figure 4C:
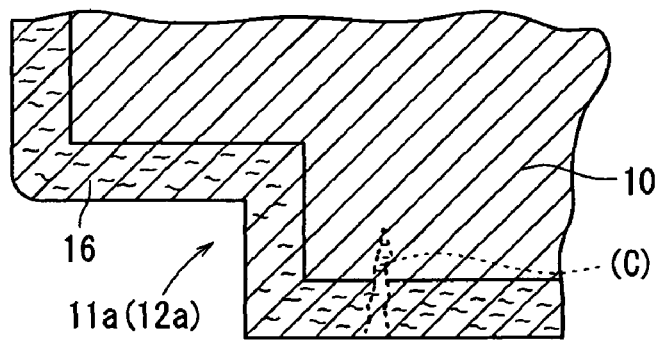

In this way, carbide is diffused into the damaged portion of the cavity 11a (12a) of the forging die 10. As a result, as shown in FIG. 4C, a diffusion layer 16 is formed, whereby the damaged portion consequently is restored.

The concentration of carbide gradually decreases, and no distinct interface appears between the forging die 10 and the terminal end of arrival of the carbide by diffusion.

Therefore, the occurrence of brittle fractures can be avoided, and toughness of the cavity 11a (12a) of the forging die 10, in which the diffusion layer 16 has been formed, can be secured. The thickness of the diffusion layer, i.e., the distance at which carbide is diffused into the die, maximally ranges to a depth of about 15 mm from the surface, in the same manner as described above.

As described above, hardness of the forging die 10 is improved again, in a region ranging to the depth at which carbide is diffused therein. The carbide exists even at inner deep portions of the forging die 10. Therefore, in addition, hardness and strength of the forging die 10 are increased at such inner portions. As a result, abrasion resistance is improved at the inner portions, and deformation of the forging die 10 rarely is caused. Further, due to the production of, for example, TiC and TiN, heat resistance of the metal is improved owing to the so-called carbide effect, and strength of the metal also is improved, owing to the so-called carbide diffusion effect.

That is, in the die repairing method according to the embodiment of the present invention, the damaged portion of the forging die 10 is filled with the coating agent, whereupon the hardness and strength thereof are increased and restored again, to improve abrasion resistance even at inner portions thereof, owing to the presence of the diffusion layer 16 at the damaged portion. Thus, deformation of the die rarely is caused. As a result, the forging die 10 can reliably be restored to a state in which the forging die 10 has its desired characteristics, enabling practical and long-term use of the forging die 10.

As described above, a long service life for the forging die 10 may be achieved by applying the reinforcement to the forging die 10 beforehand and/or by performing repairs on the forging die 10.

The methods for reinforcing and repairing the die have been described in detail above. However, the present invention is not limited to the die reinforcement and repair methods as described in the foregoing embodiments, but various changes may be made therein, within a range without deviating from the gist or essential characteristics of the present invention, as defined in the appended claims.

For example, the Fe-based alloy may be an alloy steel as well as structural alloy steels such as SCM, SNC, SNCM, and SCr, or structural steel such as carbon steel and low carbon steel.

The die is not limited to a forging die 10. The die may be any type of die, which may be used for processes other than forging, including, for example, press working dies and casting dies.

Even when reinforcement has been performed on the forging die 10 as described above, damaged portions, such as the crack C, sometimes appear when the forging process is performed for an excessively long period of time. However, in this case, repairs may appropriately be performed as described above.

The invention claimed is:

1. A method for reinforcing a die composed of an Fe-based alloy, comprising the steps of:
   coating at least a planned reinforcement region of said die with a mixed powder including a first element powder, which has a property to increase hardness of said die by forming a carbide, and a second element powder having a melting point lower than that of said first element powder; and
   carbonizing said first element powder included in said mixed powder to form a diffusion layer in said die and heat-treating at least said planned reinforcement region of said die coated with said mixed powder,
   wherein said first element powder is at least one selected from the group consisting of Fe, Ni, and Co, and
   wherein said second element powder is Al or Al—Mn eutectic alloy.

2. The method for reinforcing said die according to claim 1, wherein the heat treatment utilizes processing heat generated when a workpiece is processed with said die.

3. The method for reinforcing said die according to claim 1, wherein said Fe-based alloy is alloy steel, structural alloy steel, or structural steel.

4. The method for reinforcing said die according to claim 1, wherein a reducing agent is blended with said mixed powder in order to reduce an oxide film existing on a surface of said Fe-based alloy.

5. The method for reinforcing said die according to claim 4, wherein said reducing agent is carbon powder, resin, or Si.

6. The method for reinforcing said die according to claim 1, wherein at least one other component selected from the group consisting of W, Ti, V, Mo, and Nb is added to said mixed powder.

7. The method for reinforcing said die according to claim 2, wherein said mixed powder and said workpiece are prevented from making contact with each other by means of a parting agent applied to an inner surface of said die.

8. The method for reinforcing said die according to claim 3, wherein the alloy steel comprises tool steel, high speed tool steel, die steel, or powder high speed steel.

9. The method for reinforcing said die according to claim 3, wherein the structural alloy steel comprises SCM, SNC, SNCM, or SCr.

10. The method for reinforcing said die according to claim 3, wherein the structural steel comprises carbon steel or low carbon steel.

* * * * *